3,368,636
METHOD OF DRILLING A HOLE IN A PERMEABLE UNDERGROUND FORMATION AND DRILLING FLUID SUITABLE FOR CARRYING OUT SAID METHOD
Lodewijk J. Schmit Jongbloed and Nicolaas H. Van Lingen, Rijswijk, Netherlands, assignors to Shell Oil Company, New York, N.Y., a corporation of Delaware
No Drawing. Filed Nov. 30, 1964, Ser. No. 414,849
Claims priority, application Great Britain, Dec. 4, 1963, 47,994/63
7 Claims. (Cl. 175—72)

ABSTRACT OF THE DISCLOSURE

A method of plugging the formation pore space to prevent fluid loss comprising injecting into the formation via a borehole which is drilled with a fluid containing suspended particles so that the pressure in the borehole is greater than the pressure in the formation pore space.

---

The present invention relates to a method of drilling a hole in a permeable underground formation, wherein use is made of a rotary drill bit which is rotated and loaded, thereby forming a hole, and drilling fluid is brought into contact with at least the bottom of the hole at a pressure higher than the pressure in the formation pore space, which drilling fluid on entering the formation pore space surrounding the hole obstructs the passage therethrough by a plugging action in the pore space of the formation.

This plugging action can be caused by a precipitate which is formed by chemical reaction occurring when the drilling fluid contacts or is mixed with the formation fluid, or the plugging action can result from an increase in viscosity of the drilling fluid when entering the formation pore space.

By the plugging action in the pore space of the permeable formation a barrier is formed over some distance in the pore space of the formation part constituting the side wall and the bottom of the borehole, the pressure difference existing between the fluid inside the borehole and the fluid in the formation pore space occurring across the barrier. By the action of the bit, small fractures are formed in the bottom of the hole as a result of which the bond between the formation parts at the bottom of the hole is broken, thus forming small fragments such as chips or cuttings. Since the depth over which the formation is fractured extends only over a small part of the distance for which the barrier extends in the formation, the pressure difference existing across the fragments is small with respect to the pressure difference existing between the interior of the borehole and the formation pore space. In view of the small pressure difference across the fragments, the force required to lift the fragments off the bottom will be very small compared with the force required for lifting the such fragments off the bottom in a drilling method wherein use is made of a drilling fluid which forms a mud cake on the wall of the borehole. Then the total pressure difference existing between the interior of the borehole and the formation pore space will occur across the mud cake which results in a great force being exerted in a downward direction on the formation fragments.

Since the lifting forces for removing the fragments from the bottom of the hole are very small when using a drilling fluid forming an obstruction within the formation pore space (also called hereinafter an "internal" barrier or "internal" plastering layer in contrast to a cake which is formed on the wall of the hole and which cake is called hereinafter an "external" plastering layer), the total amount of energy supplied to the drilling operation can be used more effectively. A high penetration rate of the bit into the formation results herefrom.

An object of the invention is to provide a drilling method of the above type wherein use is made of an internal barrier or plastering layer which is created in a cheap and simple manner.

According to one aspect of the invention, the method of drilling a borehole in a permeable, underground formation using a rotary drill bit comprises contacting at least the bottom of the borehole with a drilling fluid at a pressure higher than the pressure in the formation pore space, the drilling fluid comprising particles suspended in a liquid and having substantially no external plastering properties, to deposit the particles in the pore space and substantially obstruct the passage therethrough.

Thus, the method may comprise the following steps:

(a) Rotating and loading a rotary drill bit thereby forming a borehole in the formation;

(b) Preparing prior to, simultaneously with, or subsequently to step (a), a drilling fluid comprising particles suspended in a liquid, this fluid having substantially no external plastering properties, and contacting at least the bottom of the borehole with the drilling fluid at a pressure higher than the pressure in the formation pore space whereby the particles are deposited within the pore space and substantially obstruct the passage therethrough;

(c) Replacing the bit if necessary; and, (d) Stopping the action of the bit after the hole has reached the required depth.

The particles suspended in the liquid may be solids in various forms and/or liquid droplets. Solid particles may, e.g., consist of bitumen or polymers. The droplets preferably consist of hydrocarbon or a mixture of hydrocarbons.

Preferably an emulsifying agent is added to the drilling fluid so as to promote or stabilize the degree to which the particles are suspended in the liquid.

The amount of particles present in the drilling fluid may be between 0.5 and 15% weight of the fluid. Preferably, this amount lies between 2 and 6% weight of the drilling fluid.

The drilling fluid may, in order to promote the contact thereof with the bottom of the hole, be circulated through the hole, preferably through the drill string connected to the bit, the openings in the bit body, and the annular space between the drill string and the borehole wall.

Preferably, the drilling fluid is recirculated through the hole, the undesirable amount of formation fragments present therein being removed therefrom before re-entering the borehole. It has been found that after the bulk of the fragments has been removed from the drilling liquid, e.g., by passing this liquid over a screen and/or through a cyclone or centrifuge, a small amount of fragments may remain in the liquid to be reinjected into the hole, provided that this amount is insufficient to plaster the bottom part of the hole externally during the operation of the bit.

A difference in the specific gravities of the particles and the drilling liquid on the one side, and the formation fragments on the other side will promote the separation of the fragments from the drilling fluid when using a cyclone or a centrifuge for such separation.

It will be clear that, if external plastering of the side wall of the hole should occur in the long run, such is not to be considered disastrous as after passage of the bit no fragments have any longer to be lifted from the side wall of the hole. Only such an amount of fragments which is able to form an external plastering layer on the bottom of the borehole between two successive passages of cutting elements at the same spot, will prevent the drilling method from being carried out adequately.

When starting the drilling of the borehole, no internal plastering layer has yet been formed. Drilling fluid carrying particles suspended therein passes out of the borehole into the formation pore space, whereby the particles decrease the passage through the pore space, thus increasing the resistance to flow therethrough. In this way an internal plastering layer is formed which, in the long run, at the side wall of the borehole nearly fully obstructs the passage of drilling fluid into the formation pore space.

At the bottom of the hole, however, part of the internal plastering layer is, together with formation fragments, continuously being removed by the bit action. Consequently, a restricted flow of drilling fluid occurs through the bottom of the hole into the pore space, thereby constantly depositing particles at the lower part of the plastering layer, which is thus continuously wandering downwardly into the formation in advance of the bottom of the hole, which bottom moves downwardly under influence of the bit action.

The invention will now be further described by means of tests which have been carried out in the laboratory under field conditions. In these tests use was made of bitumen, of a polymer and of a viscous oil, which substances were suspended in particle form in a liquid so as to form a drilling fluid for carrying out the method according to the present invention. It will be understood that these substances are only given by way of example, and that the invention is not limited thereto, since the required internal plugging action in the formation pore space can be obtained with the same results when using other substances suspended in particle form in a liquid.

*Tests 1 and 2*

In these tests holes were drilled in a Gildehaus sandstone having a permeability of 3 darcies by means of a 4⅛" roller cone jet bit. In both tests the bit was loaded by 3000 kilograms and rotated at a speed of 115 revolutions per minute. Both tests were carried out at formation temperatures of 25° C. and 80° C. The circulation rate of the drilling fluid was 400 liters per minute. The difference between hole pressure and pore space pressure in the undisturbed formation was 50 kilograms per square centimeter. The specific gravity of the sandstone was 2.0.

In Test 1, the drilling fluid consisted of an anionic bitumen suspension in water, containing 4% weight of bitumen particles and 1% weight of a stabilizer consisting of an alkali lignin derivative. Since it was considered desirable to operate with a weighted drilling fluid, sodium chlorde and sodium nitrate were added. The maximum soluble amount of sodium chloride was added whereby the specific gravity of the liquid present in the drilling fluid rose to 1.19. Further weighting of this liquid (up to a specific gravity of 1.30) was obtained by dissolving sodium nitrate therein. As the specific gravity of the bitumen was 1, the sandstone fragments could be easily separated in a cyclone or centrifuge from the drilling liquid without separating the bitumen therefrom.

It was found that under the above conditions a penetration rate was obtained of 2.22 millimeters per revolution at a formation temperature of 25° C. and 80° C.

A penetration rate of 2.19 millimeters per revolution at a formation temperature of 25° C. and of 80° C. was obtained in Test 2 when using cationic bitumen particles of which 2% weight were suspended in water, using a quarternary ammonium compound as emulsifying agent. No weighting material was used; the specific gravity of the liquid phase of the drilling fluid was 1. If desired, however, the specific gravity can be increased, e.g., by adding calcium chloride. The specific gravity of the bitumen was 1.

Comparing the penetration rates obtained in the above-described tests with the penetration rate of 0.28 millimeter per revolution which is obtained when using under the above conditions a convention clay/water mud which forms an external plastering layer on the side wall and bottom of the hole, it will be clear that an enormous increase in drilling rate will be reached when using the method according to the invention.

It will further be clear from the above, that cationic bitumen particles as well as anionic bitumen particles can be used in the drilling fluid according to the invention. Moreover, also non-ionic bitumen will fulfill the purpose set forth.

The internal plugging of the test rocks was clearly visible after cleaving the rocks over the hole.

*Test 3*

In this test use was made of a polymer, which consisted of 2% weight Shell "Carina" 36 having a mean particle size smaller than 1μ, which was suspended in water with the aid of a non-ionic emulsifier (such as an etheylene oxide condensate product) and which was applied for drilling a test hole in Euville limestone having a permeability of 30 millidarcies with a 1¼" two cone jet roller bit. The bit was loaded with 400 kilograms and rotated at a speed of 32 revolutions per minute at a temperature of 20° C. The circulation rate of the drilling fluid was 50 liters per minute and the difference between the hole pressure and the undisturbed formation was 50 kilograms per square centimeter.

A penetration rate of 1.65 millimeters per revolution was obtained, which resulted in an important increase of the drilling speed when compared with the penetration rate of 0.57 millimeter per revolution when using drilling fluid consisting of 5% weight bentonite, 16% weight Limburgia clay and 14% weight gas oil and 65% weight water.

*Test 4*

In this test use was made of an oil-in-water emulsion, comprising particles in the form of oil droplets having a means diameter of 5μ. The oil consisted of a fuel oil having a viscosity of 3500 sec. Redwood I at 38° C., which was emulsified in water by means of a lignin derivative. Under the same conditions as described under Test 3, there were drilled test holes at a penetration rate of 1.68 millimeters per revolution.

As is generally known, the permeability of the formation or formations through which a hole is drilled is never constant over the region through which the hole penetrates. It has been found that when using the present method when drilling through formations having a wide range of permabilities, there is no need to change the composition of the drilling fluid when passing with the bit through an impermeable formation. It is remarked that when comparing the penetration rate through an impermeable formation when using an internally plastering drilling fluid as used in the present method with the penetration rate obtained when using an externally plastering drilling fluid, the first rate will be considerably higher than the second one, on account of the fact that as the fluid used in the method according to the invention has no externally plastering properties, it can easily enter the cracks around the formation fragments when the latter are lifted from the bottom of the hole. However, when using a fluid having externally plastering properties, the lifting of the fragments will result in a vacuum zone in the fractures which counteracts the lifting force and consequently decreases the penetration rate of the bit.

This can be illustrated by drilling tests carried out in Belgian limestone having a permeability of less than 0.01 millidarcie. The holes were drilled by means of a 4⅛" roller cone jet bit loaded with 7000 kilograms and rotated at 115 revolutions per minute. When using the drilling fluid according to Test 2 (comprising a cationic bitumen suspension in water containing 2% weight of bitumen and a quaternary ammonium compound as an emulsifying agent) at a circulation rate of 400 liters per minute, a penetration rate of 0.55 millimeter per revolution was obtained at a formation temperature of 80° C. However, when using a conventional clay/water mud under the same conditions, the penetration rate was only 0.3 millimeter per revolution.

The increase of penetration rate when using the method according to the present invention can be obtained with all types of rotary bits, such as drag bits, diamond bits, rotary bits, which bits are either designed so as to create a full hole, or to form an annular hole for coring purposes.

The best results will be obtained when drilling in permeable formations having a permeability which is higher than 10 millidarcies.

As has already been mentioned, soluble salts may be added to the drilling fluid in order to increase the specific weight thereof. There can also be added other additives (e.g., for increasing the thixotropy of the fluid or for weighting the fluid) provided that these additives do not form an external filter cake on the side wall and the bottom of the borehole. To achieve this, the additives must be soluble in the liquid or of the same dimensions or smaller than the particles, or they must have such dimensions that when they form a layer on the wall of the hole the particles can easily pass therethrough.

We claim as our invention:

1. A method of drilling a borehole in a permeable underground formation using a rotary drill bit, which comprises contacting at least the bottom of the borehole with an aqueous drilling fluid containing a stabilizing agent and between 0.5% and 15% by weight of the fluid particles selected from the group consisting of anionic bitumen particles, cationic bitumen particles, polymeric particles and particles consisting of a non-miscible liquid which particles have substantially no plastering properties, at a pressure higher than the pressure in the formation pore space, and depositing the particles in the pore space and substantially obstruct the passage therethrough.

2. A method of drilling according to claim 1 wherein the particles consist of anionic bitumen.

3. A method of drilling according to claim 1 wherein the particles consist of a polymer.

4. A method of drilling according to claim 1 wherein the particles consist of a non-miscible liquid.

5. A method of drilling according to claim 1 wherein the particles consist of cationic bitumen.

6. A method of drilling according to claim 1 wherein the specific gravity of the particles differs from the specific gravity of the formation fragments.

7. A method of drilling according to claim 1 wherein the specific gravity of the particles is substantially equal to the specific gravity of the liquid phase of the drilling fluid.

References Cited

UNITED STATES PATENTS

| | | | |
|---|---|---|---|
| 2,259,875 | 10/1941 | Bent et al. | 175—72 X |
| 2,380,156 | 7/1945 | Dobson et al. | 175—72 X |
| 2,812,161 | 11/1957 | Mayhew | 175—72 X |
| 3,040,822 | 6/1962 | Graham et al. | 175—70 |
| 3,158,210 | 11/1964 | Cannon et al. | 175—72 |
| 3,221,825 | 12/1965 | Henderson | 175—72 |
| 3,223,185 | 12/1965 | Jongbloed et al. | 175—65 |
| 3,228,469 | 1/1966 | Kern et al. | 175—72 X |

CHARLES E. O'CONNELL, *Primary Examiner.*

RICHARD E. FAVREAU, *Assistant Examiner.*